United States Patent [19]

Borgida et al.

[11] Patent Number: 5,418,943
[45] Date of Patent: May 23, 1995

[54] INFORMATION SYSTEM WITH KNOWLEDGE BASE AND DATA BASE

[75] Inventors: Alexander T. Borgida, Highland Park; Ronald J. Brachman, Westfield, both of N.J.

[73] Assignee: AT&T Corp., Murray Hill, N.J.

[21] Appl. No.: 781,464

[22] Filed: Oct. 23, 1991

[51] Int. Cl.$^6$ .............................. G06F 15/40
[52] U.S. Cl. ..................... 395/600; 364/DIG. 1; 364/282.1; 364/274.3; 364/274.8
[58] Field of Search ................. 395/700, 600, 650

[56] References Cited

U.S. PATENT DOCUMENTS

| | | | |
|---|---|---|---|
| 4,841,441 | 6/1989 | Nixon et al. | 364/401 |
| 4,884,218 | 11/1989 | Agnew et al. | 364/513 |
| 5,021,992 | 6/1991 | Kondo | 395/600 |
| 5,159,667 | 10/1992 | Borrey et al. | 395/148 |
| 5,197,005 | 3/1993 | Shwartz et al. | 364/419 |
| 5,237,502 | 8/1993 | White et al. | 364/419.01 |
| 5,278,980 | 1/1994 | Pedersen et al. | 395/600 |
| 5,282,265 | 1/1994 | Rohra Suda et al. | 395/12 |

OTHER PUBLICATIONS

E. Mays, et al. "Experience with K-Rep: An Object-Centered Knowledge Representation Language", Proceedings 4th Conference on Artificial Intelligence Applications, Mar. 14, 1988, San Diego, USA, pp. 62–67.
J. Yoon, et al., "Development of an Inference System for Deductive Database Systems", Proceedings TENCON 87 Conference on vol. 2, Aug. 25, 1987, Seoul, Korea, pp. 835–840.
A. Borgida, et al., "Classic: A Structural Data Model for Objects", ACN SIGMOD Record on Management of Data, vol. 18, No. 2, Jun. 1989, Portland, USA, pp. 58–67.
M. M. Hammer and D. J. McLeod, "Database Description with SDM: A Semantic Database Model", ACM Transactions on Database Systems, vol. 6, No. 3, Sep. 1981.
P. G. Selfridge, "Knowledge Representation Support for a Software Information System", Proc. of the Seventh IEEE Conf. on AI Applications, Miami, Fla., Feb. 1991, pp. 134–140.
R. J. Brachman and J. G. Schmolze, "An Overview of the KL-One Knowledge Representation System", Cognitive Science, vol. 9, No. 2, Apr.–Jun., 1985, pp. 171–216.
W. A. Woods and J. G. Schmolze, "The KL-ONE Family," Computers and Mathematics with Applications, Special Issue on Semantic Networks in Artificial Intelligence, to appear.
L. A. Resnick, et als., "CLASSIC The CLASSIC User's Manual," AT&T Bell Laboratories Technical Report, 1991.
R. J. Brachman, et als., "Living with CLASSIC: How and When to Use a KL-ONE-Like Language," J. Sowa, ed., Principles of Semantic Networks: Explorations in the Representation of Knowledge, Morgan Kaufmann, 1991, pp. 401–456.
"Bridging the Information Gap", in *A Review of Products, Services, and Research, AAAI-87*.

Primary Examiner—Kevin A. Kriess
Attorney, Agent, or Firm—Gordon E. Nelson

[57] ABSTRACT

Apparatus and methods for integrating a knowledge base management system with a data base system. The knowledge base management system employs compositional descriptions which describe information in terms of concepts. A translation component of the apparatus translates compositional descriptions into data base queries, so that information matching a compositional description may be retrieved from the data base. The translation component further permits display of the retrieved data in terms of the compositional description. The returned information can be automatically integrated into the knowledge base, either item by item or on the basis of the compositional description which was used to return the information.

29 Claims, 6 Drawing Sheets

FIG. 6

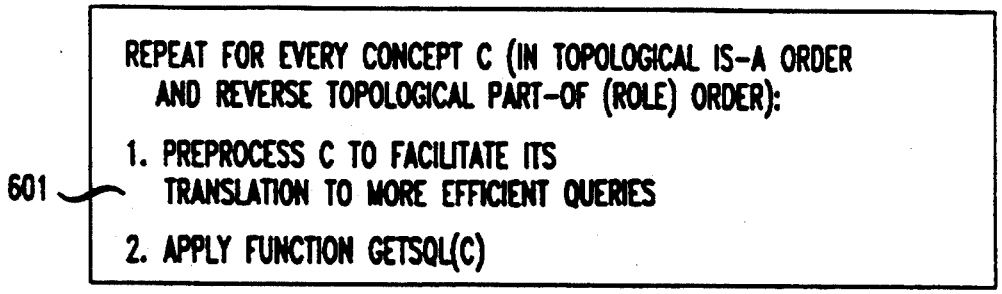

ALGORITHM 1

601 — REPEAT FOR EVERY CONCEPT C (IN TOPOLOGICAL IS-A ORDER AND REVERSE TOPOLOGICAL PART-OF (ROLE) ORDER):
1. PREPROCESS C TO FACILITATE ITS TRANSLATION TO MORE EFFICIENT QUERIES
2. APPLY FUNCTION GETSQL(C)

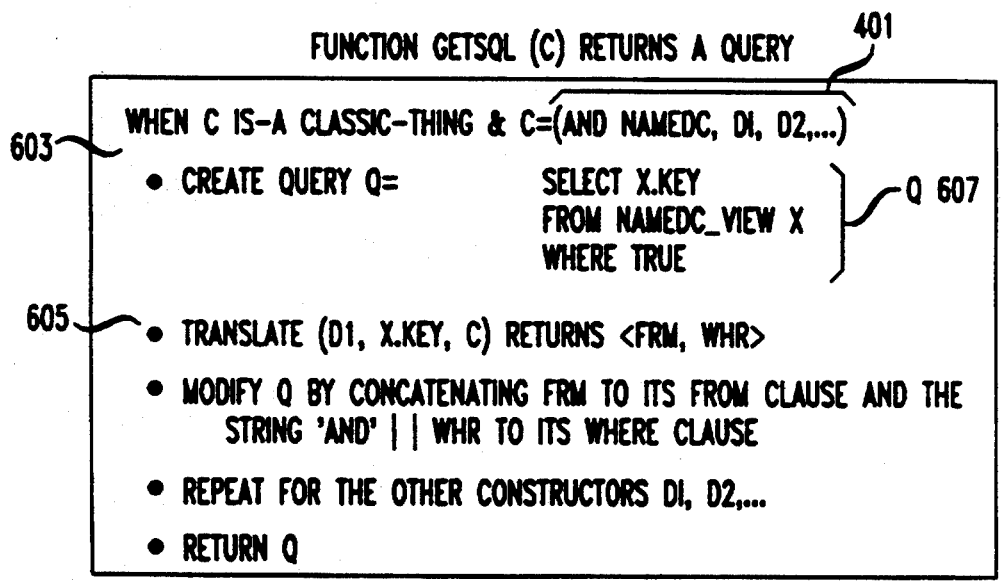

FUNCTION GETSQL (C) RETURNS A QUERY — 401

603 — WHEN C IS-A CLASSIC-THING & C=(AND NAMEDC, D1, D2,...)
- CREATE QUERY Q=    SELECT X.KEY
                     FROM NAMEDC_VIEW X    } Q 607
                     WHERE TRUE

605 — • TRANSLATE (D1, X.KEY, C) RETURNS <FRM, WHR>
- MODIFY Q BY CONCATENATING FRM TO ITS FROM CLAUSE AND THE STRING 'AND' || WHR TO ITS WHERE CLAUSE
- REPEAT FOR THE OTHER CONSTRUCTORS D1, D2,...
- RETURN Q

FIG. 8

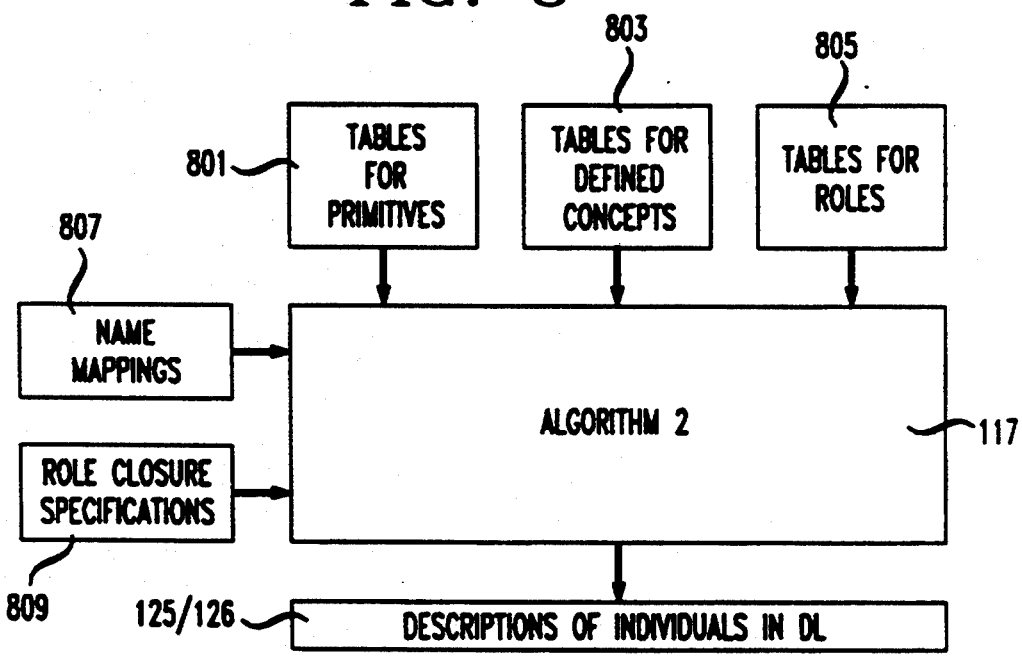

FIG. 7

ALGORITHM 1 (CONTINUED)
FUNCTION TRANSLATE (D, X, C) RETURNS [FM, WH]

```
FM := ''; WH := '';

D=(FILLS P B) =>           FM=VIEW_P Y
                           WH:=(X=Y.FROM) AND (Y.TO=DBNAME(B))

D=(ONEOF A, B...) =>       WH:=(X IN DBNAME((A, B,...)))

D=(NUMBDS P LO HI) =>      WH:=EXISTS (SELECT*
                                       FROM VIEW_P Y
                                       WHERE (X=Y.FROM)
                                       GROUP BY Y.TO
                                       HAVING LO<=COUNT (*)<=HI)

D=(ALL P (ONE OF-H A, B,...) =>  FM:=VIEW_P Y
                                 WH:=NOT EXISTS (SELECT*
                                                 FROM VIEW_P Y
                                                 WHERE X=Y.FROM AND
                                                 Y.TO NOT IN (A,B,...))

D=(ALL P (TEST-H F) =>     FM:=VIEW_P Y
                           WH:=NOT EXISTS (SELECT*
                                           FROM VIEW_P Y
                                           WHERE X=Y.FROM AND
                                           NOT F(Y.TO))

D=(ALL P E) =>             WH:=NOT EXISTS (SELECT*
                                           FROM VIEW_P Y
                                           WHERE X.KEY=Y.FROM AND
                                           Y.TO NOT IN GETSQL(E))

D=(SAMEAS (P1 P2)(R)) =>   FM:=P1_VIEW V1, P2_VIEW V2, R_VIEW W
                           WH:=(X=V1.FROM AND V1.TO=V2.FROM)
                               AND (X=W.FROM)
                               AND (V2.TO=W.TO)
```

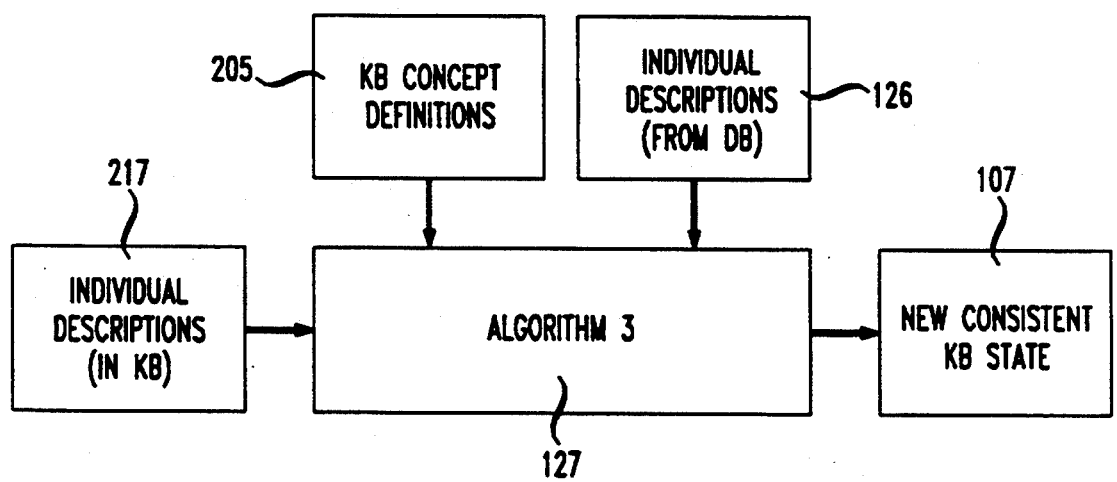

ALGORITHM 3:

1. ENTER THESE INTO THE KBMS VIA A "TRAP DOOR" THAT AVOIDS DOING INFERENCES

2. DETECT INCONSISTENCIES:

ISSUE QUERIES FOR NEGATION OF NECESSARY ASPECTS OF PRIMITIVES, AND PRINT ERRORS FOR ANY INDIVIDUALS FOUND

3. DETECT SPECIAL CASES WHERE ADDITIONAL WORK NEEDED IN KBMS

-ISSUE DATABASE QUERIES TO FIND NEED FOR PROPAGATIONS AND INVOKE KBMS INFERENCE MECHANISM ON THESE SPECIFIC ASPECTS

-ISSUE QUERIES TO FIND OBJECTS FOR WHICH RULE FIRING IS NEEDED AND APPLY RULE FIRING MECHANISM

-POPULATE CLASSES WHICH INCLUDE TEST-FUNCTIONS ON KB OBJECTS (RATHER THAN HOST VALUE OBJECTS)

INFORMATION SYSTEM WITH KNOWLEDGE BASE AND DATA BASE

BACKGROUND OF THE INVENTION

1. Field of the Invention

The invention relates to information systems in which data is stored and accessed by means of query language statements. Examples of such information systems include conventional database management systems of various sorts, including relational databases, "object-oriented" databases, computer file systems in which data is stored and retrieved, and artificial intelligence systems with explicitly stored knowledge bases that hold information for use by a human user, expert system, or other artificial intelligence algorithms.

2. Description of the Prior Art

Information systems that store large amounts of patterned data are widespread in virtually all areas of business. These range from simple file systems to complex database management systems that store data as "records," usually in secondary memory, such as magnetic tape, magnetic disks, or optical disks. A general introduction to modern database management systems can be found in Ramez Elmasri and Shamkant B. Navathe, Fundamentals of Database Systems. Redwood City, Calif.: The Benjamin Cummings Publishing Company, Inc., 1989. Such systems usually have—at least implicitly—a fixed pattern for each type of entry. Records, for example, would have fixed sets of fields, and each individual record would have the same set of fields as all others in its category. Each field in a record may contain particular bits representing data. The data is usually either numbers or strings. Standard data management systems require a relatively small set of record formats to be specified in advance; these together are called the "schema." In general, the schema, once chosen, cannot be easily modified.

Another important aspect of information systems of the above sort is that there is usually some way to retrieve data out of the information system. While some are crude or stylized or strictly form-based, and some are very complex formal languages, we refer to instances of the set of querying and retrieval mechanisms as "query languages". Users (or sometimes computer programs) form queries in these query languages, "evaluate" them on the information base, and have returned to them answers to their queries. We refer to the form of these answers as "tables", since that is representative of a large class of data management systems (e.g., relational database management systems), although not every information system returns its answer in the literal form of tables.

A typical interaction with information systems has a human user constructing a query in the query language, evaluating it against the information base, and having a table or set of tables returned in textual form on a screen, on a hard copy, or in a computer file. The user may look at the tables and then construct a new query that may possibly incorporate parts or all of the prior query (or several prior queries). Database management systems have been constructed to optimize certain types of retrievals, and relational databases have generally been designed to respond to queries in a language called "SQL", which has become a de facto standard in the industry. While providing basic query-answering competence, this language has certain important limitations in the way in which it allows the user to conceptualize the information in the database. It forces the user to interact with the data in a very rigid pattern (see below).

Another problem with most conventional information systems is that they do not store queries in a conceptual ("intensional," as opposed to "extensional") form, so that they can be compared, explored, or reused without complete reevaluation. Once a query on a very large database has been evaluated, it could be very convenient and time-saving to save the results of the query and the query itself in a form that can be reused without computing it again. Even the notion of "views", which are a mechanisms that allow a user to conceptualize a database in some other form than that given in the schema, is restrictive. Views must themselves be in the same strict tabular form as standard database tables, and the operations which may be performed on them are limited:

Views cannot be compared to one another;

The only way in which an inference can be done on a view is by doing it on all rows of the underlying tables;

Views cannot be directly updated. Instead, any new tuples for a view must be inserted into the tables upon which the view is based;

Views (and the relational algebra on which they are based) do a poor job of handling partial or incomplete information.

Further, while adding homogeneous information to a standard database is easy, it is difficult or impossible to add new heterogeneous pieces of information (i.e., descriptions of objects that are exceptional or unorthodox in some way).

There have been recent attempts to solve the above problems of data bases by integrating the knowledge bases employed by some types of artificial intelligence with data bases. For a general introduction to knowledge bases and their structure, see Ronald J. Brachman, "The Basics of Knowledge Representation and Reasoning", *AT&T Technical Journal*, Vol. 67, No. 1, pp. 7-24. Prior attempts to use knowledge-base processing systems as interfaces to information management systems include IntelliCorp's KEEConnection system ("Bridging the Information Gap", in *A Review of Products, Services, and Research, AAAI-87*), which allows a user to bring data from a database into a KEE knowledge base. SDM (M. M. Hammer and D. J. McLeod, "Database Description with SDM: A Semantic Database Model", *ACM Transactions on Database Systems* 6, No. 3, Sept. 1981) uses a hierarchical "semantic data model" to allow more object-oriented viewing of a relational database. Neither of these systems uses a formal compositional description language, which is central to the success of the present invention, nor do they perform the classification inference that allows the present invention to generate correct queries automatically for composite descriptions. "Natural language access to database" systems attempt to allow the user to express queries in natural languages like English. These systems further do not allow the results of queries to be automatically stored and organized in the knowledge base. The CODE-BASE system, described in Peter G. Selfridge, "Knowledge Representation Support for a Software Information System", *Proceedings of the Seventh IEEE Conference on AI Applications*, Miami Beach, Fla., February, 1991, pp. 134-140, is based on the same description logic as the present invention's preferred embodiment, but does not take advantage of the classification inference to allow automatic generation of queries from composite descriptions. In sum, all prior systems that attempt to connect databases and knowledge base processing systems either rely on the user exclusively to form all queries (or mappings to the database for all forms in the knowledge base) by hand, or do not take advantage of a compositional description language to allow the storing, organizing, and automatic generation of database queries. It is thus an object of the apparatus and methods disclosed herein is to overcome these problems of the prior systems.

SUMMARY OF THE INVENTION

The above object is achieved by apparatus for accessing a data base of entities accessible by a query language. The apparatus includes
- means for making a class description that defines a class to which one or more of the entities potentially belong;
- means for translating the class description into one or more statements in the query language which locate entities belonging to the class defined by the class description; and
- means for employing these statements to locate in the data base the entities belonging to the class.

In other aspects, the means for translating provides class descriptions which include the entities located in the data base, the means for making a class description includes means for storing the located entities and means for incorporating the entities into an organization of classes, and the means for making a class description includes means for adding a new class description to the organization of classes.

It is thus an object of the invention to provide improved access to information.

It is a further object of the invention to provide data base systems in which queries can be made in conceptual terms.

It is an additional object of the invention to provide data base systems in which information provided by the data base system may be dealt with in conceptual terms.

These and other objects and advantages of the invention will be apparent to those of ordinary skill in the art after perusing the Detailed Description and Drawing, wherein:

BRIEF DESCRIPTION OF THE DRAWING

FIGS. 6 and 7 present the pseudo-code for Algorithm 1;

FIG. 8 shows the processing to be applied to tables returned from the information system and converted into the descriptions of individual objects in the description language (Algorithm 2);

FIG. 9 gives pseudo-code and an example of the operation of Algorithm 2; and

FIG. 10 shows Algorithm 3, which takes the individual descriptions provided by Algorithm 2 and installs them in the description system's knowledge base, and also gives the pseudo-code for Algorithm 3.

DETAILED DESCRIPTION

The following Detailed Description begins with an overview of the invention and then proceeds to a detailed description of a preferred embodiment thereof.

Figure 1:
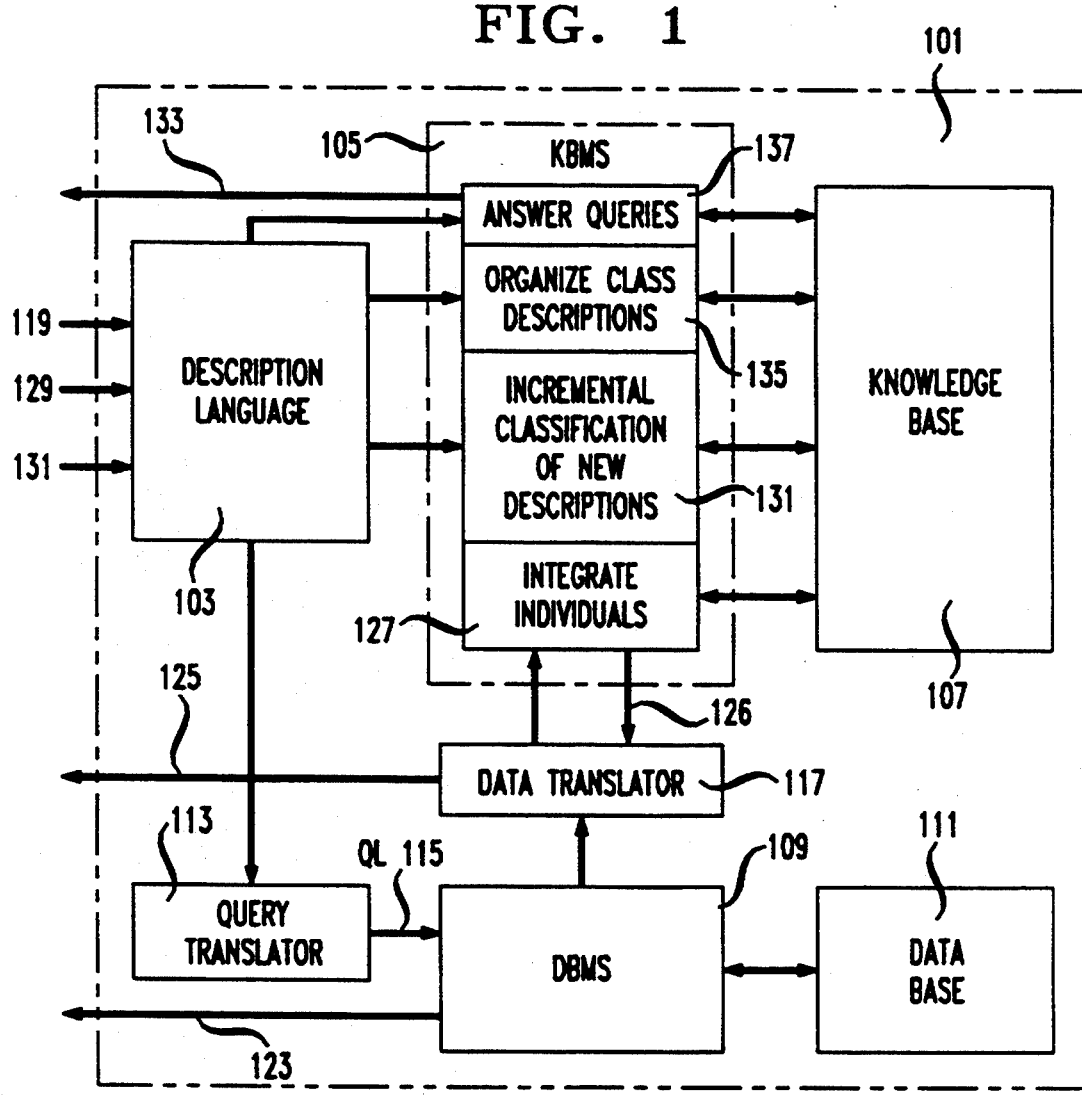
FIG. 1 illustrates the overall structure of the invention; it includes the principal components of each of the mechanisms in the embodiment.

Overview of the Invention: FIG. 1

FIG. 1 shows an artificial intelligence system 101, which involves a database of facts and which is implemented using the present invention. The major components are the following:
- Description Language (DL) 103 is the set of syntactic rules for forming descriptions that the user will use to describe classes of interest in the data;
- Knowledge Base Management System (KBMS) 105 accepts descriptions in Language 103 and organizes those descriptions and stores them in an organized structure in a knowledge base, 107; KBMS 105 also answers the user's queries when posed in DL 103;
- Database Management System (DBMS) 109 allows a user access to dam stored in a potentially large database 111;
- Query translator 113 translates a user's description in DL 103 into the query language (QL) 115, accepted by DBMS 109; and
- Data translator 117 translates data returned from DBMS 109 into DL 103, and presents that transformed data either to the user or to KBMS 105.

The operation of system 101 is as follows: The user presents a query to be answered 119. This query is created by means of description language 103, which specifies the syntactic conventions by which the query should be constructed. The query formulated in DL 103 (121) is passed to query translator 113, which translates it into QL 115, which is accepted by the database management system 109. DBMS 109 processes the query with respect to the data in its stored database 111, and returns the answer in the form of tables 123 to the user.

It is also possible for the user to receive the result of the query expressed in DL 103, by having the result of the query passed through data translator 117. This yields DL 103 descriptions of the appropriate individuals in the database (125/126).

The results 126 of the query in the form produced by translator 117 can also be passed directly to the KBMS 105 and stored for future reference (using KBMS integration process 127). Finally, the user can add a new description 129 expressed in DL 103 directly to the knowledge base 107. Once expressed in DL 103, this new description 129 can be added to the organized descriptions resident in knowledge base 107 by means of incremental description integration process 131. The added effect of this integration is that all individual objects previously introduced into knowledge base 107 are automatically tested to see if they satisfy the new description, and any that succeed are classified as belonging to that new description 129.

At any point, KB MS 105 can accept a user description (131) as a query to be answered directly by the KBMS, based on the information that has been stored in knowledge base 107. The answer to such a query 133 thus takes into account any previous descriptions entered into the KB 107 as well as all data entered there from the database 111 via translator 117.

Detailed Description of the Structure and Operation of the Invention

Figure 2:
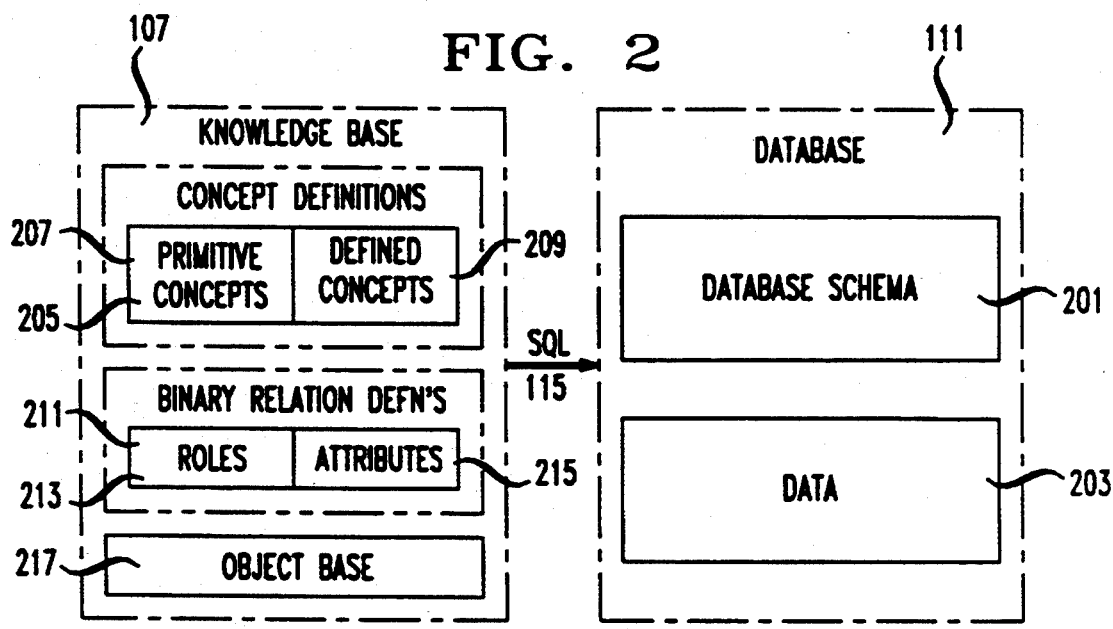
FIG. 2 illustrates the substructures of the two information-storing components of the system (the description system knowledge base and the information system database) in the preferred embodiment.
Figure 3:
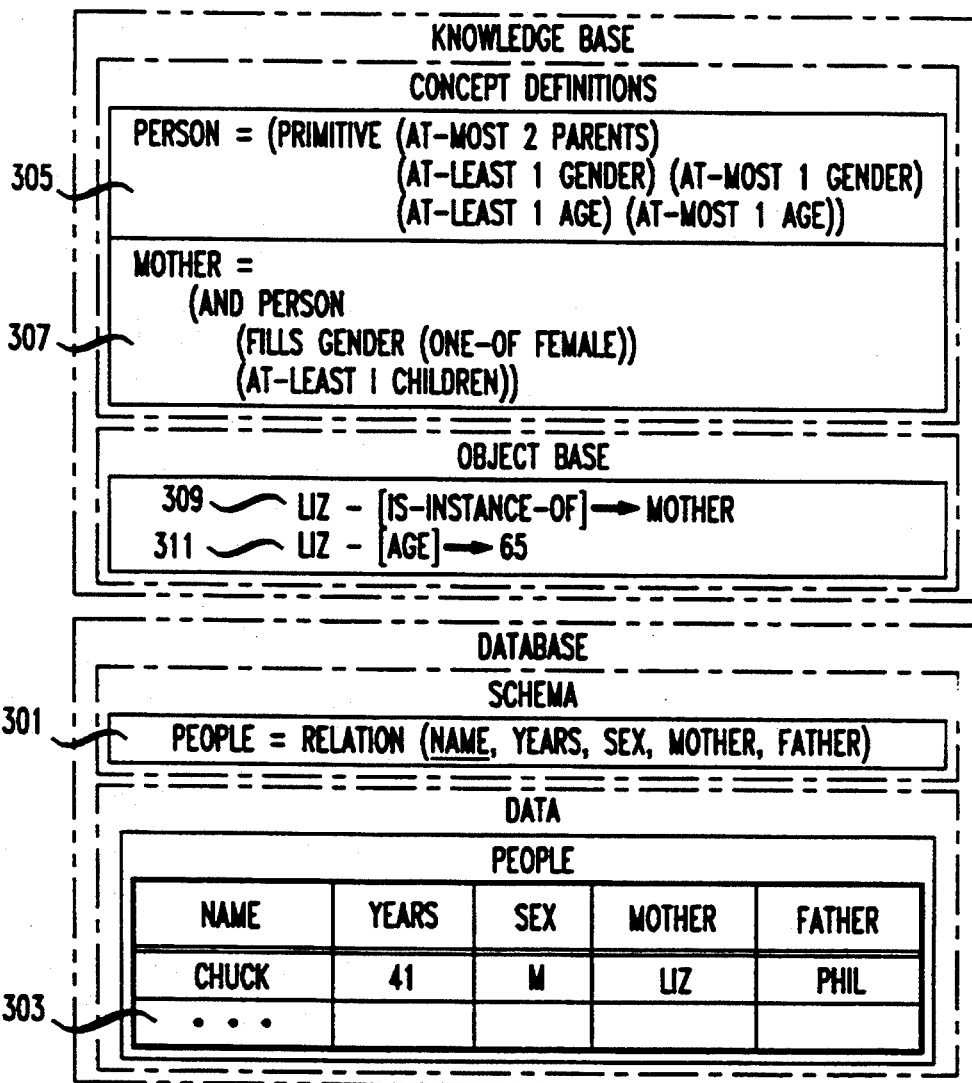
FIG. 3 illustrates a concrete example of the language forms used within the description system as well the form of statements of information in the information system schema and database.

In a preferred embodiment, the initial "raw" data is held in a conventional database (111), managed by a conventional database management system (109). This embodiment uses a relational database manager, which, as exemplified in FIG. 2, contains at least a database schema 201 and the data 203 in the form of relational tables. Relational DB managers of this sort are widespread and well-known (for an introduction to database technology, see Navathe, supra. The tables are simply sets of records or "rows", each row in a given table having the same structure as all other rows in the table (this is specified by the schema for that table). In FIG. 3, for example, we see a sample record from the table "PEOPLE" 303. The schema for this table 301 dictates the form of the rows, in particular stating that each row in the PEOPLE table must have a name field, and age, sex, mother, and father fields (the "domains", or set of permissible values, can also be specified in the schema; e.g., age might be restricted to an integer, whereas sex must be a member of the set {M,F}). In the example, a person whose name is 'Chuck' is described as having years=41, sex='M', mother='Liz' and father='Phil'.

In a preferred embodiment, data 203 in the database 111 is accessed via a query language 115. The most common example is SQL, which allows the user to select various columns (technically a projection) from sets of tables, where the selection of rows is constrained by various clauses, including those that "join" together two tables based on the value of an attribute (e.g., joining two tables based on social security number would yield a row with combined information about the same individual). The form of SQL queries is relatively simple:

select <field names>
from <table names>
where <constraints that rows must satisfy>.

Such a select statement can also be followed by a "group by" clause that allows the aggregation of properties by collecting together all rows that have the same field values, as dictated by the group by clause. For example, if a table CHILD_TABLE was capturing the set of relationships between a person and his/her children by having one row per parent/child pair, the number of children for each person could be obtained by this query:

select parent,count(*)
from CHILD_TABLE
group by parent.

In the preferred embodiment, the knowledge base management system 105 is based on a class of formalisms called "description logics" (often referred to as "terminological logics"). These are a well-known class of artificial intelligence representation languages that owe their origin in large part to a well-known system called KL-One (R. J. Brachman & J. G. Schmolze, "An Overview of the KL-One Knowledge Representation System", Cognitive Science, Vol. 9, No. 2, April-June, 1985, pp. 171-216). The key ingredient of such description logics is a description language (DL 103) that allows the user to express complex descriptions (the rough equivalent of English noun phrases) in a compositional way; that is, the language allows the expression of fully defined concepts that are built in a compositional manner from previously defined concepts. A concept like "CAT" would not be fully defined in a DL, since it is virtually impossible to find a full necessary and sufficient specification of the properties of cats. This would make the formal description CAT be what is called a "primitive" description or concept. However, the concept of a "CAT with blue eyes" could be built compositionally from the concept CAT and the attribute EYE-COLOR. Thus, CAT-WITH-BLUE-EYES (the formal description or concept) would be considered a compositional or "defined" description or concept.

DL-based KBMS systems take the user's description of terms like. CAT-WITH-BLUE-EYES and "classify" them—find their relationships to all previously specified terms. This classification procedure relies on the ability to find a generalization (or "subsumption") relationship between any pair of terms expressed in the DL. The classification process finds all previously-specified descriptions that are more general (i.e., that subsume) the new one, and all previously-specified descriptions that are more specific (i.e., that are subsumed by) the new one. They can find which of the more general ones are most specific, and which of the more specific ones that are most general, and place the new one in between those. This yields a generalization ordering amongst the concepts—a partial ordering based on the subsumption relationship. This is usually drawn as a hierarchy of some sort, although most DL's permit any description to have multiple parent (more general) descriptions, and thus do not yield a strictly hierarchical ordering.

In a preferred embodiment, the DL of choice is the language, CLASSIC (L. A. Resnick, "The CLASSIC User's Manual", *AT&T Bell Laboratories Technical Report*, 1991; R. J. Brachman, A. Borgida, D. L. McGuinness, P. F. Patel-Schneider, and L. A. Resnick, "Living with Classic: How and When to Use a KL-One-like Language", in J. Sowa, ed., *Principles of Semantic Networks: Explorations in the Representation of Knowledge*, Morgan Kaufmann, 1991, pp. 401-456). CLASSIC has a number of description-forming constructs representative of the family of description languages mentioned above. A CLASSIC knowledge base 107 has three main pans (see FIG. 2): (1) a set of concept definitions 205; these are the named descriptions that are stored and organized by the CLASSIC KBMS. As mentioned above, they can be either primitive (207) or compositional ("defined"—209); (2) a set of binary relation definitions 211; in CLASSIC these can be "roles" 213, which can have more than one value (e.g., child), or "attributes" 215, which can have only a single filler (e.g., age, mother); and (3) a set of individual object descriptions 217, which characterize individual objects in the world in terms of the concept definitions 205 and which are related together by means of the role definitions 211.

Examples of the DL 103 constructs are given in FIG. 3. The PERSON primitive concept definition 305 says that a person is, among other things (the qualification is the meaning of the "PRIMITIVE" construct), something with at most two parents, exactly 1 gender and exactly 1 age. The MOTHER compositional concept definition 307 equates the term MOTHER with the phrase "a person whose gender is exactly 'female' and who has at least one child". In the object portion of the knowledge base we have assertions that individuals satisfy named concepts 309, i.e., LIZ satisfies the previously defined concept, MOTHER; and we also have assertions of the relationships between individuals 311 in terms of roles such as age (not shown, since they have no structure in this embodiment), such as LIZ has age=65.

Algorithms supported by the KBMS 105 include (1) the classification of descriptions 135, as discussed above; this provides the ability to take class or individual descriptions 129 from the user and to add them to the knowledge base 107 in the correct place in the generalization ordering; (2) an algorithm 137 that directly answers users' queries 131 from the knowledge base 107; (3) an incremental classification algorithm for new descriptions 131 that takes a new description 129 and adds them to the generalization ordering as well as classifies all individuals currently in the object base 217 with respect to the new description; this algorithm can be a variant or algorithm 135; (4) a special set of KBMS integrator functions 127 that allow the integration of individuals coming from the database without invoking the classification functions 135. This is a "back-door" way to create individual objects in the knowledge base 107 without invoking very complex, time-consuming classification machinery. The individuals must be integrated in a way that preserves consistency and integrity in the knowledge base. Such integration is one of the key aspects of the present system. The assurance that the integration is properly done is given by the proper construction of queries to the database manager 109 by the translator 113.

The Query Translator

As related above, a user forms descriptions and/or queries in the description language 103. These are presented to the system and an appropriate place in a generalization ordering of other descriptions is found by algorithm 135. The user-generated description may possibly be named and stored permanently in the generalization ordering in knowledge base 107. In the case where the user's description is fully compositional and uses only terms already known to the system, a query in the query language 115 of the database is algorithmically generated by query translator 113 and issued to the database. If the database query processing has been optimized, this query is composed to take advantage of that optimization. In any case, the query is structured so that when a result is returned to the description language system, the basic classification algorithm for individual objects does not have to be ran. This is one key advantage of the present invention: since databases like 111 tend to be huge compared to the typical use of KBMS systems like 105, and SQL query processors are highly optimized and the databases are highly indexed, the amount of time it takes a DB query processor (109) to compute an answer and then install it in the knowledge base without classification is normally be significantly less than the time it takes to add one individual object at a time from the database and use the normal classification algorithm 135 to find the fight parent descriptions for all (potentially tens of thousands) of the new individuals.

Figure 4:
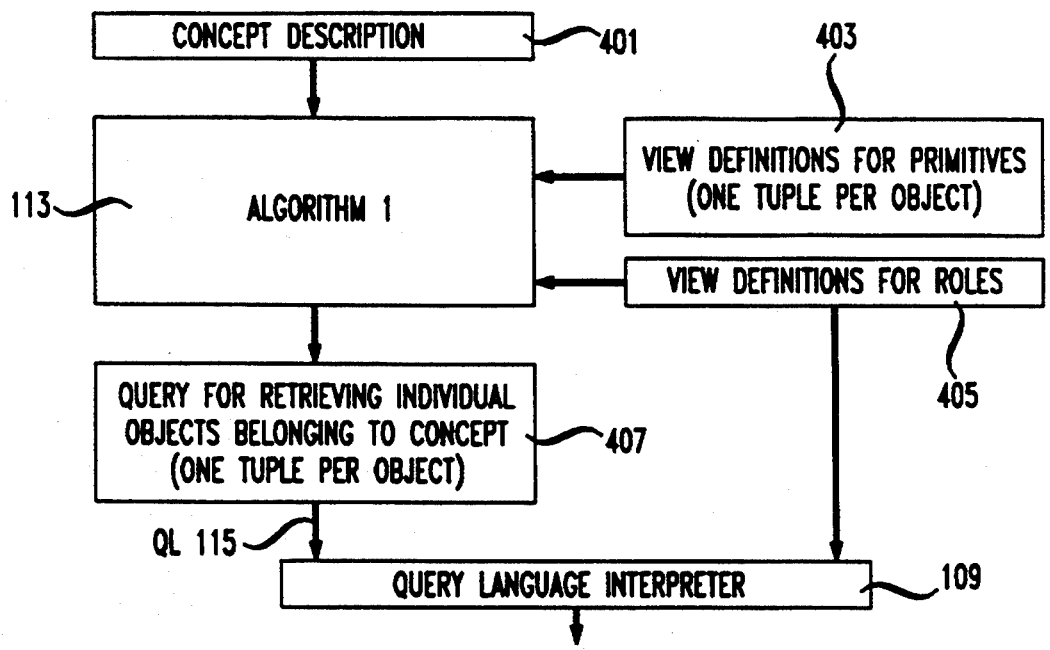
FIG. 4 shows the processing necessary to take composite descriptions in the description language and produce queries in the query language; this illustrates one of the primary mechanisms of the present invention (Algorithm 1)

Classification algorithm 135 is normal machinery for DL-based systems like CLASSIC and many others, see William A. Woods and James G. Schmolze, "The KL-ONE Family," to appear in *Computers and Mathematics with Applications, Special Issue on Semantic Networks in Artificial Intelligence*, but query translator 113 is not. FIG. 4 shows more detail on the present invention with respect to the translator. The heart of the translator is Algorithm 1, which takes as input a compositional concept description 401 expressed in DL 103, and two sets of view definitions, 403 and 405. The view definitions are query language 115 (SQL) expressions for the primitive concepts and roles defined in the knowledge base 107.

Figure 5:
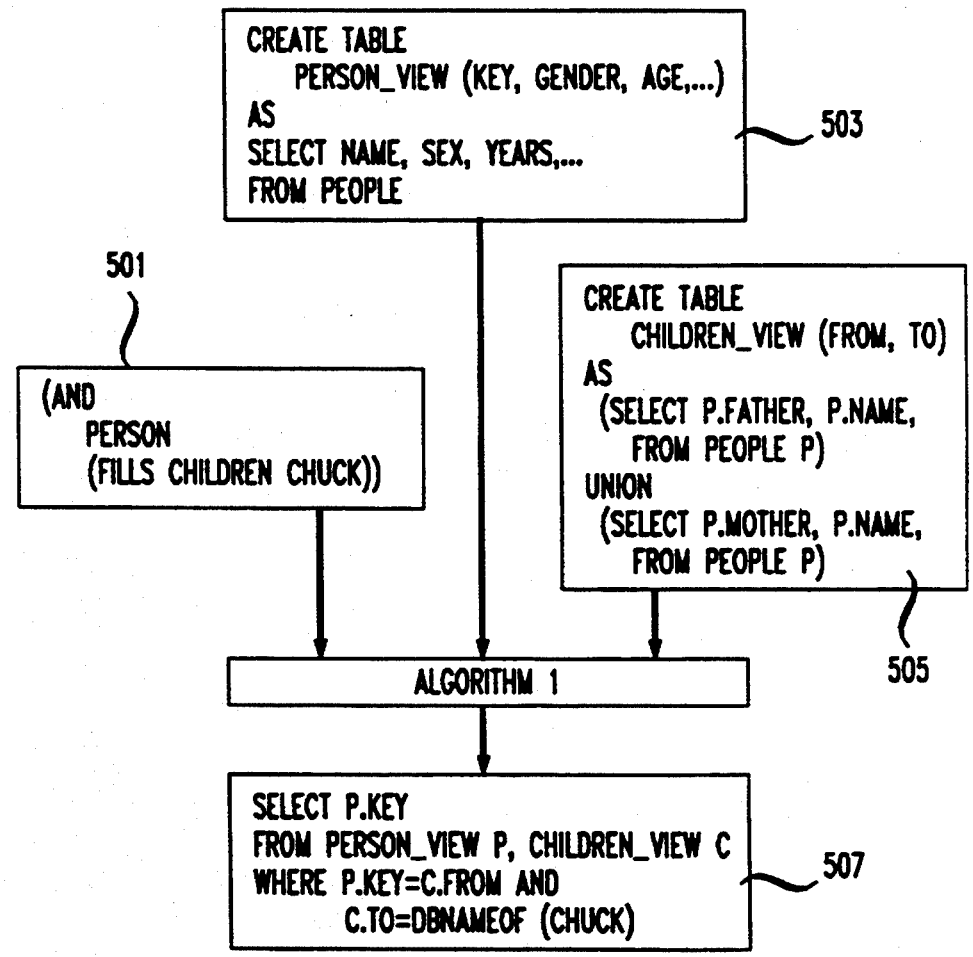
FIG. 5 gives examples of the inputs and outputs of the various components in FIG. 4.

View definitions 403 are for primitive concepts; they are constructed such that when executed by the query language interpreter 109 they return tables with one row each for each object that satisfies the primitive concept description. For example, as shown in FIG. 5, a primitive concept like PERSON can be defined by a view 503 (PERSON_VIEW), which retrieves one row per person in the database; this view derives such a table from the database table PEOPLE. Note that the rows returned must also have filled in values from the database for each attribute; in this example, the PERSON view 503 derives the value of the gender attribute from the sex field of the database record, and derives the value of its age attribute from the years field of the database record. Note also that each row produced must have a key, so that each individual can be given a unique name in the knowledge base based on the key. In example 503, the key is taken from the name field of the PEOPLE table. This is a particularly simple view, since it maps a single database field onto a single knowledge base attribute, but the mappings can be and typically are substantially more complex.

View definitions 405 are similar. They correspond to roles in the knowledge base 107. A role view definition must return a table from the database that has two fields in each row, one for the individual from whom the role will emanate in the knowledge base 107, and one for the value of that role. View definition 505 gives an example. It defines the view for determining fillers of the child role from the database. Note that CHILDREN_VIEW will return a table with rows with two fields, the first calculated by fetching either the father or mother field of the PEOPLE relation, the second calculated by fetching the name of the person. Thus, our example above will return this table given view definition 505 (the UNION operator in SQL produces a table that is the union of two tables):

| col1 | col2 |
|------|------|
| Phil | Chuck |
| Liz | Chuck |

The intent here is that when passed appropriately back to the knowledge base, Phil and Liz will each be given Chuck as a filler of their children roles. In other words, each will independently be asserted to have Chuck as a child. Note that this transformation from the database is not as obvious as the prior one—we are translating from a single table with separate fields for mother and father to separate assertions of the child relation for Liz and Phil. In a sense this inverts the direction of the relationship in the translation.

Views such as 503 and 505 are taken as input by Algorithm 1, and used to translate input concept descriptions 401 to the database query language. For example, if the user inputs the description 501, which means "a person whose children include Chuck", Algorithm 1 will utilize the view definitions 503 for PERSON and 505 for children (which are both used in description 501 ), and create the SQL query 507. Query 507 joins the PERSON_VIEW and children_VIEW tables, asking to return any rows from the PERSON_VIEW table whose name is the same as the "from" field in the children_VIEW able (this is the join; to make sure that both tables are talking about the same individual, the key field generated by view 503 is used here), and where the person in question is in the "from" field of a row in the children_VIEW table where the database name (DBName) of Chuck is in the "to" field of the same row. In the case mentioned above, this will return the rows for Liz and Phil that presumably exist in the PEOPLE table (not shown).

Algorithm 1 for constructing such queries 407/507 is depicted in FIG. 6. The preprocessing step 601 transforms the query 401 to a form more convenient for processing. Preprocessing involves at least, for every description in the stored generalization ordering, (1) separation of restrictions involving attributes from those involving roles; (2) separation of restrictions of the form (ALL p (ONE-OF . . . )) and (ALL p (TEST-H . . . )) from general ALL restrictions of the form (ALL p C); (3) combination of (AT-MOST n p) restrictions with (AT-LEAST m p) restrictions into single restrictions, (NUM-BDS p mn). This phase makes mapping into effective SQL queries easier (e.g., attributes can be gathered with individuals, as illustrated in FIG. 5, but roles must be expressed in separate rows in a role-view table).

Function GetSQL 603 actually computes the query. It uses subsidiary function Translate 605, which is described in FIG. 7. Basically, GetSQL first creates an empty SQL query Q 607. Assuming that the DL description C (401) is the conjunction of a named concept NamedC and set of constructors D1, D2, etc., GetSQL then calls Translate on the D1, and passes it a reference to the key of the view defined for NamedC. Translate 605 returns two sets of clauses, which are then concatenated to the from clause of Q607 and the where clause of Q607. This in essence produces the query corresponding to the conjunction of NamedC and D1. The process is repeated for D2, etc., until all constructors are translated. The result is the final query to be passed to the DBMS 109.

Note that if the initial description 401 has more than one named concept in it, one table for each additional named concept is added to the from clause, a new variable is assigned to that table, and a join specification is created in the where clause, e.g., if the two concepts NamedC and NamedC2 are conjoined, the resulting query would be:

select x.key
from NamedC_VIEW x, NamedC2_VIEW y
where x.key=y.key

GetSQL 603 then proceeds as before.

Details of Translate 605 are illustrated in FIG. 7. The variables fm and wh are initialized to be null strings. The constructor type (FILLS, ONE-OF, etc.) of D is matched against the patterns 701, and whichever pattern is matched triggers the assignment of fm and wh, which are then returned.

The Data Translator: FIG. 8

FIG. 8 illustrates Algorithm 2, which is the heart of data translator 117. This algorithm takes as input tables resulting from a database query, and translates the rows of the tables into descriptions of individual objects (125/126) in the description language 103. It assumes that one row of a table generated by a concept query (either 801 or 803) will correspond to one individual object to be created; one row of a role table 805 (a table created by a role query 405/505) will result in the assertion of a single relationship between two objects. Algorithm 2 also takes as input a set of name mappings 807 and a set of role closure specifications 809. The mappings 807 allow for the fact that the same individual can be indicated one way in a database and a completely different way in a knowledge base (for example, the DB may use social security numbers to identify individuals, and the knowledge base may use first and last name pairs). The closure specifications 809 indicate whether or not the data in the database is considered complete for a given role (see below).

FIG. 9 provides some pseudo-code for Algorithm 2, and an example of its output, generated by a query for PERSONs and their children (this would be issued, for example, when trying to initially populate the knowledge base 107 with complete descriptions of all people described in the database 111). An individual object that is indicated by a row of a concept table from the database has three relevant parts: (1) the parent concept in the knowledge base 107 that was used to find the individual; in the example 901, this would be PERSON; (2) values for the attributes in the knowledge base for the object; in the example 901, these would be the values for gender and age; (3) values for any relevant roles in the knowledge base; in the example, the values for children would be computed by the role view definition 505. In order to convert these rows to descriptions in DL 103, the three simple steps in Algorithm 2 are used. Note that attributes of objects appear in the rows of the tables returned from concept queries (along with the key to the individual object). An individual is created for each row in the concept table; its name is generated from the key specified in that row. That name can be just the key (e.g., Liz), a combination of the concept name and the key (e.g., Person#Liz), or some mapping from the key to an identifier, as specified by the user (e.g., Elizabeth-Jones). Each value of each attribute is described in DL 103 based on a mapping (807) specified by the user (e.g., the number (65) for the age is just mapped into a number in DL 103; it could just has well have been mapped into a discrete value like "SeniorCitizen"). In Step 2 of Algorithm 2, the role values (children in the example) are added to the description. In the CLASSIC language, the user has the option to state whether the role should be "closed" when the data from the database is filled in (in the preferred embodiment, this is done with role closure specifications 809). This would mean that the data in the database is complete, and no further fillers of the role can be claimed. If the database has complete information about people's children, then we would have Algorithm 2 close the children role. In the event that the database is incomplete, and Liz might have other, unspecified children, we would not close the role. The example 901 shows no role closure operations. Finally, when completely populating the knowledge base 107 from the database 111 (but not when simply asking a query), the complete list of parent concepts that describe the individual object can be determined. In the example, Liz would not only be found by the PERSON view definition, but also by one for MOTHER, since she is Female and has at least one child. The parent concepts can be consolidated in a list, as in the example 901.

Integration with the Knowledge Base

The final piece of the preferred embodiment is the mechanism for taking the output of the data translator 117 and integrate the descriptions of individuals into the knowledge base 107. The integration mechanism 127 is illustrated in FIG. 10. The first step is to take descriptions 126 issued from the data translator 117 and enter these into the database 107 without invoking the normal individual classification functions 135. These result in direct assertions of concept membership for the individuals, direct assertions of the attributes for the individuals, and direct assertion of role relationships, all without integrity checking, inheritance of properties, or classification. Once the initial assertions are made (which will typically be substantially faster than if the normal classification functions had been used), it is important to check directly for inconsistencies (in case the data in the database does not match the schema requirements of the knowledge base). This is done in Step 2 of Algorithm 3, which issues queries to the database with the negations of any necessary properties of the relevant primitive concepts in the knowledge base, and with checking of disjoint primitive views for overlaps. For example, if it were required in the knowledge base that every PERSON must also be an EMPLOYEE, this step would issue a query looking for persons who were not employees; if any were found, the user would be warned of such a violation. Under normal use of a KBMS like CLASSIC, these requirements would be checked as soon as an update is made; since integrator 127 does not invoke the normal classification apparatus, it must make these checks for consistency, even if it avoids classification.

Additionally, description languages like CLASSIC may have facilities for computing inferences that are not duplicable with SQL queries; these include (1) forward-chaining rules; (2) "test-functions" that invoke user code written using CLASSIC objects and functions, rather than functions over base (or "host") values; the latter (but not the former) would allow their invocation directly as pan of the SQL query execution (e.g., as C programs); and (3) forms of inferential propagation that depend on the state of the knowledge base and not just on the schema for a concept or role. Once again, since the normal data entry mechanism has been circumvented for efficiency reasons in the present invention, these inferences must specifically be invoked after the direct assertions are made to the knowledge base. The substeps of Step 3 of Algorithm 3 indicate what must be done in the case of a CLASSIC knowledge base 107. Inferential propagations that need additional queries are invoked, and the normal KBMS 105 inference mechanisms are invoked when the original SQL is insufficient. Rules indicate further descriptions to be added to individuals when they are found to satisfy certain descriptions; rule invocation must be facilitated by issuing queries that find all objects to which a rule is applicable but for which the consequent of the rule does not hold; these would be found by the means already described, which determines the instances satisfying named descriptions. The normal CLASSIC mechanisms could then be used to apply the rules that need application. Further, in CLASSIC, rules can be "filtered", meaning that only members of a subset of the instances of a named concept should have the rule applied to them. Queries must be formed and evaluated that correspond to the filters. Finally, while test functions that apply to "host values"—values such as numbers and strings, which are represented directly in the implementation language—can be evaluated directly against the database in the view definitions, test functions that apply to knowledge base objects ("CLASSIC individuals") must be applied in this post-processing phase. These may eliminate some candidates from some descriptions that they otherwise appear to satisfy, given only the view definitions.

CONCLUSION

The foregoing Detailed Description has disclosed to those skilled in the arts to which the invention pertains how one may make and use a system for evaluating queries expressed in a formal description language against a database with a conventional query language interface. Other techniques than those disclosed herein for practicing the invention and other areas in which the invention may be applied will be apparent to those skilled in the arts concerned after reading the foregoing disclosure. For example, the invention applies to any database or information system mechanism, including all those that honor SQL queries, or others (e.g., object-oriented databases) that do not, as long as they have a formal query interface. This could even include a knowledge base management system in place of the database system in the presented embodiment. In place of the CLASSIC system in this embodiment, any system that supports a description language with compositional descriptions can be used. This would include all systems considered to be "terminological logics" such as LOOM, BACK, etc., as well as others that support compound descriptions, such as OMEGA. While the CLASSIC system performs its inference in what is known as a "forward-chaining" manner—that is, all inferences are performed in a forward direction as soon as updates are made—the present invention applies equally well to systems that use different regimes for inference, including backward-chaining and hybrid reasoning strategies.

Because of the wealth of possible embodiments of the invention, the foregoing Detailed Description is to be understood as being in every respect illustrative and exemplary, but not restrictive, and the scope of the invention disclosed herein is not to be determined from the Detailed Specification, but rather from the claims as interpreted in light of the Detailed Description and in accordance with the doctrine of equivalences.

What is claimed is:

1. Apparatus for locating entities comprising:
    means for making a compositional description built from a previously-defined concept which defines a collection to which one or more of the entities potentially belongs;
    means for translating the compositional description into a query;
    a data base for storing the entities; and
    a data base management system for responding to the query by locating the entities belonging to the collection in the data base.
2. The apparatus set forth in claim 1 wherein:
    the data base management system further responds to the query by providing a table of the located entities.
3. The apparatus set forth in claim 1 wherein:

the means for translating further receives the located entities and produces a compositional descriptions defining the located entities.

4. The apparatus set forth in claim 3 further comprising:
a knowledge base and a knowledge base management system in which the compositional description defining the located entities is usable, the knowledge base management system responding to the compositional description defining the located entities by adding the located entities to the knowledge base.

5. The apparatus set forth in claim 4 wherein:
the knowledge base management system responds to the compositional description defining the located entities by adding the located entities as a collection to the knowledge base.

6. The apparatus set forth in claim 5 wherein:
the knowledge base management system includes means for providing a compositional description which checks for a first possible inconsistency between one or more of the located entities in the collection and the knowledge base;
the translating means receives the compositional description which checks for the possible inconsistency, translates the received compositional description into a query, and returns the results of the query to the knowledge base management system; and
the knowledge base management system responds to results which indicate a possible inconsistency by issuing a warning concerning the collection.

7. The apparatus set forth in claim 6 wherein:
the means for providing a compositional description provides another compositional description which checks for a second possible inconsistency between the located entities and the knowledge base to the knowledge base; and
the knowledge base management system responds to results from the knowledge base which indicate the second possible inconsistency by issuing the warning.

8. The apparatus set forth in claim 4 wherein:
the knowledge base management system further responds to the compositional description defining the collection by adding the compositional description to the knowledge base.

9. The apparatus set forth in any of claims 2, 4, 6, or 8 wherein:
when the knowledge base management system responds to a compositional description, the knowledge base management system reorders the knowledge base as required for the compositional description.

10. Apparatus for operating, on entities comprising:
a knowledge system for performing operations based on compositional descriptions of the entities which are built from previously-defined concepts;
a data base system for performing at least the operation of answering data base queries concerning the entities; and
translation means for receiving one of the compositional descriptions, making at least one data base query therefrom, receiving an answer to the data base query from the data base system, and providing a compositional description for the answer to the knowledge system for use in an operation of the knowledge system.

11. The apparatus set forth in claim 10 wherein:
the operation of the knowledge system which is performed using the provided compositional description is adding any entities in the provided compositional description to the knowledge system.

12. The apparatus set forth in claim 11 wherein:
the operation of adding any entities includes the operation of using the provided compositional description to determine whether there is an inconsistency between the entities being added and the knowledge base prior to adding the entities.

13. The apparatus set forth in claim 12 wherein:
the operation of using the provided compositional description to determine inconsistencies includes the operations of providing a compositional description derived from the provided compositional description to the translation means and determining from the answer to the data base query made by the translation means in response to the derived compositional description whether there is an inconsistency.

14. A method employed in an information system including a data base system of obtaining a collection of entities from the data base system comprising the steps of:
receiving a first compositional description built from a previously-defined concept in the information system which defines the collection of entities;
automatically translating the first compositional description into a first query for the data base system; and
employing the first query to locate the collection of entities in the data base system.

15. The method set forth in claim 14 further comprising the steps of:
automatically providing a second compositional description which describes the entities in the located collection; and
using the second compositional description in a knowledge system to add the entities in the located collection to the knowledge base.

16. The method set forth in claim 15 further comprising the steps of:
automatically deriving a third compositional description from the second compositional description;
automatically translating the third compositional description into a second query for the data base system; and
employing the second query to obtain a result from which an inconsistency between an entity in the located collection and the knowledge base may be determined.

17. The method set forth in claim 16 wherein:
the steps added in claim 16 are performed before the entities in the located collection are added to the knowledge base.

18. The apparatus set forth in claim 1 wherein:
an element of the compositional description defines one or more of the entities; and
the query includes an expression by means of which the defined entities are located in the data base.

19. The apparatus set forth in claim 18 wherein:
the element is a primitive; and
the expression serves to locate one or more entities defined by the primitive.

20. The apparatus set forth in claim 18 or claim 19 wherein:
the element is a role; and the expression serves to locate one or more entities which fill the role.

21. The method set forth in claim 14 wherein:
an element of the compositional description defines one or more of the entities; and
the step of automatically translating the first compositional description includes the step of including an expression by means of which the defined entities are located in the data base.

22. The method set forth in claim 21 wherein:
the element is a primitive; and
the expression serves to locate one or more entities defined by the primitive.

23. The method set forth in claim 21 or claim 22 wherein:
the element is a role; and
the expression serves to locate one or more entities which fill the role.

24. Apparatus for operating on entities comprising:
a knowledge base system for performing operations based on compositional descriptions of the entities which are built from previously-defined concepts;
a data base system for performing at least the operation of answering data base queries concerning the entities;
translation means for receiving one of the compositional descriptions, making at least one data base query therefrom, receiving a result of to the data base query from the data base system, and providing compositional descriptions of any entities in the result; and
integration means for receiving the compositional descriptions for the entities and integrating the compositional descriptions for the entities into the knowledge base system without classifying the compositional description for each entity individually.

25. The apparatus set forth in claim 24 wherein:
the integration means further uses the compositional descriptions for the entities to determine whether there is an inconsistency between the entities being integrated into the knowledge base system and the knowledge base system prior to their integration.

26. The apparatus set forth in claim 25 wherein:
the integration means determines whether there is an inconsistency by providing a compositional description derived from the compositional descriptions of the entities to the translation means and determining from the answer to the data base query made by the translation means in response to the derived compositional description whether there is an inconsistency.

27. A method employed in a knowledge base system of adding a collection of entities obtained from a data base system to the knowledge base system comprising the steps of:
translating a query used to obtain the collection of entities from the data base system into compositional descriptions of the entities; and
integrating the compositional descriptions for the entities into the knowledge base system without classifying the compositional description for each entity individually.

28. The method set forth in claim 27 wherein the step of integrating further comprises the step of:
determining from the compositional descriptions for the entities whether there is an inconsistency between the entities being integrated into the knowledge base system and the knowledge base system prior to their integration.

29. The method set forth in claim 28 wherein the step of determining further comprises the steps of:
deriving a compositional description from the compositional descriptions of the entities;
translating the derived compositional description into a data base query; and
determining from the answer to the data base query whether there is an inconsistency.

* * * * *